Jan. 5, 1971 B. LITTWIN 3,553,086

METHOD FOR INCREASING THE COERCIVE FIELD STRENGTH OF STORAGE ELEMENTS EMPLOYING THIN MAGNETIC LAYERS

Filed Dec. 22, 1967

INVENTOR
BURKHARD LITTWIN

BY Hill Sherman Meroni Gross & Simpson
ATTORNEYS

United States Patent Office 3,553,086

Patented Jan. 5, 1971

3,553,086

METHOD FOR INCREASING THE COERCIVE FIELD STRENGTH OF STORAGE ELEMENTS EMPLOYING THIN MAGNETIC LAYERS

Burkhard Littwin, Munich, Germany, assignor to Siemens Aktiengesellschaft, Munich, Germany, a corporation of Germany Filed Dec. 22, 1967, Ser. No. 692,952
Claims priority, application Germany, Dec. 29, 1966, S 107,660
Int. Cl. C23b 5/52, 5/48
U.S. Cl. 204—37 10 Claims

ABSTRACT OF THE DISCLOSURE

A method of increasing the coercive field strength of storage elements in the form of a storage layer, and the production of a storage matrix employing such elements, in which a ferromagnetic, preferably nickle-iron, material having a uniaxial anisotropy of magnetization is employed, comprising the steps of conductively or electrochemically applying a nonmagnetic metal, nonmagnetic compound or nonmagnetic alloy to the storage layer, and tempering the coated arrangement by the application of heat during and/or subsequent to the applying step, to effect a diffusion of such coating material into the storage layers, the metal of such coating, for example, expediently may be indium, cadmium, zinc, tin or bismuth. In producing a storage matrix the ferromagnetic material is applied to the surface of one side of a carrier plate, the areas forming storage areas are masked by isolating material and the nonmagnetic material pplied to the unmasked positions, following which the arrangement is tempered, excess material not vapor diffused removed, and the isolating material removed.

Figure 1:
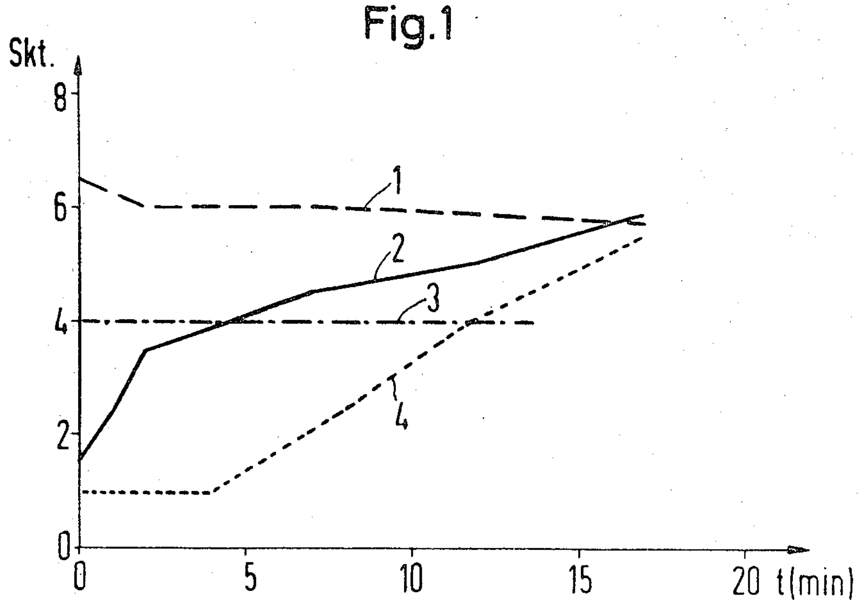

Studies have shown that storage elements consisting of thin magnetic or ferromagnetic layers, preferably magnetostrictive-free nickel/iron layers, having preferred axes of magnetization, can be demagnetized not only by a non-recurrent external magnetic field (control field) applied in the form of a pulse, experimentally determined according to the value and direction, but that undesirable demagnetizations take place under the effect of a plurality of necessary control field pulses which are individually subcritical, that is, pulses of a field strength whose value lies below the value necessary for demagnetization of the layer by a non-recurrent control pulse. The effect of these subcritical pulses is to demagnetize the layer by the creeping of the wall domain areas, so that an undesirable breakdown of the information stored in the storage element is eventually brought about.

To avoid this information breakdown in the pulse-like operation of a storer composed of such storage elements, certain demands are made on the magnetic properties of the storage element. For example, the coercive field strength $H_c$ of the ferromagnetic layers, such as nickel/iron layer, must be sufficiently large and shall approximately correspond to the value of the anisotropic field strength $H_K$ so that an increase also is effected in the maximum field strength $H_{Bmax}$, which determines the beginning of the information breakdown. Moreover, the angular dispersion $\alpha_{90}$, that is, the angular divergence of the preferred axis of magnetization in the magnetic layer, shall assume low values to obtain the lowest possible value for the minimally required writing-in field strength $H_{Bmin}$, in order to attain a sufficiently large operating range $H_{Bmax}$–$H_{Bmin}$.

Several possibilities are presented for increasing the coercive field strength $H_c$. With a simultaneous requirement for low values of the angular dispersion $\alpha_{90}$, however, only limited high values for the coercive field strength are attainable, since as a rule, increase in the coercive field strength is accompanied by a rising angular dispersion $\alpha_{90}$.

To increase the coercive field strength by a certain value without altering the angular dispersion $\alpha_{90}$, "magnetic double layers" have already been proposed, each preferably comprising at least two approximately magnetostrictive-free nickel/iron layers, having preferred axes of magnetization, assembled in stack formation and separated by an nonmagnetic, electrically conducting or electrically insulating interlayer, as the case may be, having a thickness of, for example, 20 A.

Moreover, a method for arriving at the coercive and anisotropic field strengths of the storage elements of a matrix has been proposed in which the storage elements are aligned with their magnetic preferred axes arranged substantially parallel to each other and yet freely selectable as to their anisotropic and coercive field strengths. The storage elements of the matrix are tempered in a high vacuum in a constant magnetic field aligned parallel to the approximately equal magnetic preferred axes of the storage elements disposed one below the other for a definite period of time, for example one hour, at a temperature lying above the temperature of the carrier of the storage matrix during evaporation of the storage elements.

By tempering in a constant magnetic field aligned perpendicularly to the magnetic preferred axes of the storage elements, the values for the anisotropic and coercive field strengths of the individual storage elements can be controlled to a considerable extent. Investigations have shown that the lowering of the anisotropic field strength $H_K$ and an increase of the coercive field strength $H_c$ can be attained by increasing the tempering temperature and/or the tempering time. The anisotropic field strength and the ratio of the coercive field strength thereto can be greatly varied by proper selection of the tempering conditions, the tempering taking place in a high vacuum.

It is an object of the present invention to produce a method for manufacturing storage elements, of the type mentioned above, whose stored information will not be broken down even with frequent partial control of the storage elements, that is, even under the effect of many subcritical control fields on the magnetic layers.

To solve this problem, the invention proposes, in a storage element composed of a ferromagnetic layer, particularly at least approximately magnetostrictive-free nickel/iron layer, that a nonmagnetic metal, nonmagnetic metallic compound or alloy be conductively or electrochemically coated thereon, and tempered into the storage layer during and/or after the coating.

The proposal according to the invention utilizes, for example, in the conductive precipitation of a metal penetrating into the ferromagnetic layer, that is, of a "diffusion metal," the effect of the reducing action of the nascent hydrogen liberated "in situ" on the cathode (ferromagnetic layer) which wholly or partially removes the oxide layer obstructively opposing a vapor diffusion of the diffusion metal into the ferromagnetic layer, whereas the simultaneously precipitated metal or likewise the precipitated metallic compound or alloy hinders a renewed oxidation of the magnetic layer surface.

To avoid a damaging effect on the ferromagnetic storage layers and, as the case may be, on the carriers of these layers, it is recommended that nonmagnetic metals, alloys or metallic compounds having low melting points be used as diffusion metals. Investigations have shown that, for example, indium, cadmium, tin, zinc or bismuth provide very favorable results, that is, relatively high values for the coercive field strength of the storage elements.

The tempering of the magnetic layers, as well as the coating of diffusion material, expediently takes place at a temperature lower than the melting temperatures of the metals or of the metallic compounds or alloys deposited on the storage layer. By selecting a temperature range remaining below the melting temperature of the respective diffusion material, a melting of the diffusion material, coated conductively or electrochemically on the magnetic layer, is prevented and, consequently, also its uncontrolled distribution on the magnetic layer.

A considerable advantage of the invention, particularly from the production viewpoint, resides in the fact that the tempering can be carried out in air, thus rendering unnecessary the use of vacuum installations, particularly high-vacuum installations, heretofore necessary in known methods for increasing the coercive field strength without producing unfavorable magnetic layers.

Moreover, the method according to the invention makes it possible to select the tempering time, as well as the tempering temperature, in a simple manner in accordance with the desired coercive field strength, and suitably controlled, for example by a device which continuously measures the value of the coercive field strength.

Upon conclusion of the tempering it is recommended that the metal, metallic compound or alloy remaining on the storage layer and not vapor-diffused therein be removed conductively or by one of the known etching processes in order to effectively interrupt the diffusion process and thus to attain a constancy of value for the coercive field strength established in the magnetic layer by the diffusion of the diffusion material. After complete removal of the remaining diffusion material, even a further increase of the temperature does not produce a change in the achieved value of the coercive field strength.

Investigations conducted in this connection have shown, for example, that a magnetic layer coated on a glass carrier, whose coercive field strength has been increased in accordance wtih the method of the invention from 1.7 oe. to 4 oe., after subjection to a temperature of 52° C. for two minutes, did not shown any change in the coercive field strength $H_c$ established and showed an angular dispersion $\alpha_{90}$ after storage for 240 hours at 80° C. From these results it can be concluded that even at relatively high operating temperatures of the storer occurring in the subsequent operation of the storer and conditioned, for example, by adjoining heat-radiating components, no deviations take place from the values for the coercive field strength once established.

The principles of this invention may best be understood by referring to a practical example.

Figure 2:
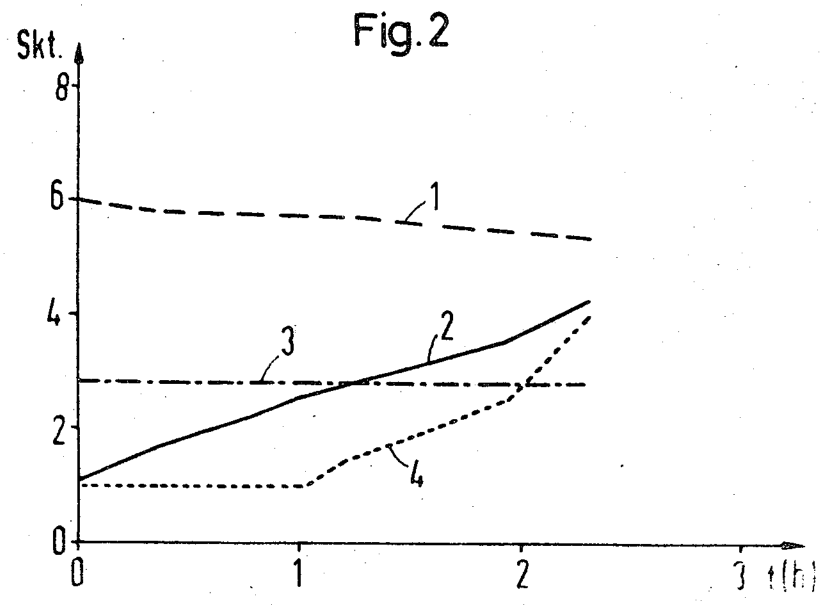

In the drawings, wherein like reference numerals indicate like or corresponding features:

FIG. 1 is a chart illustrating the effect of a diffusion metal with respect to tempering time at a temperature of 57° C.; and FIG. 2 is a similar chart for a temperature of 56° C.

At least approximately magnetostrictive-free nickel/iron layers, applied on a carrier support through vapor diffusion, are coated with tin in a sulphuric acid tin bath or in an alkaline tin chloride ($NaOH—SnCl_2$) solution at a current density of 0.1 to 0.6 A./dm.$^2$ and subsequently tempered in an air atmosphere at 57° C. (FIG. 1) or 56° C. (FIG. 2). The diffusion effect of the tin in the nickel/iron layer on the coercive field strength $H_c$, the anisotropic field strength $H_k$, the angular dispersion $\alpha_{90}$ and the change of the magnetic flow or of the magnetic layer thickness $d_m$ equivalent thereto are to be considered. FIGS. 1 and 2 show examples of the behaviour of these values, in which $H_c$ and $H_k$ (measured in oe.), $d_m$ (measured in $10^2$ A.) and $\alpha_{90}$ (measured in degrees) are plotted over the tempering time (min.). The magnetic layers are evaporated on the carriers of these storage layers partially at 185° C. (FIG. 1) and partially at 272° C. (FIG. 2). The coercive field strength $H_c$ rises with increasing tempering time as illustrated by the curves 2 of FIGS. 1 and 2. The anisotropic field strength $H_k$ is not altered thereby as illustrated by the curves 3 in both figures, whereas the magnetically active layer thickness $d_m$ slowly decreases with progressive vapor diffusion of the tin into the magnetic layer as illustrated by the curves 1 in FIGS. 1 and 2.

It is noteworthy, among other things, that in carrying out the method according to the invention, that is, in contrast to nickel/iron layers vapor-deposited and tempered with copper, for example, the angular dispersion $\alpha_{90}$ remains small up to a ratio of almost 1 of the coercive field strength to the anisotropic field strength, $H_c/H_k$, and does not increase prior thereto, as is apparent from the curves 4 of both figures. The course of the angular dispersion $\alpha_{90}$ illustrated in these figures with rising values for the coercive field strength is quite advantageous and causes the minimum writing-in field strength $H_{Bmin}$ initially mentioned to remain practically constant up to a $H_c/H_k$ ratio of 1, so that the increase of the coercive field strength attained in accordance with the invention works out in favor of an enlargement of the operating range $H_{Bmax}–H_{Bmin}$.

To obtain the desired value for the coercive field strength, the heating step is controlled with respect to the temperature and the period of time at the particular temperature. By measuring the value of the coercive field strength by an appropriate instrument during the heating or tempering operation, the desired period of time for the heating operation can be determined by the change in the value of the coercive field strength and the heating step thereby controlled for a given temperature.

Moreover, the proposal according to the invention can be utilized for the manufacture of a storage matrix having storage elements disposed in columns and rows, whereby the manufacture of the matrix takes place without the etching of the undesired layer areas, unavoidable in the methods known heretofore for manufacturing isolated storage spots from continuous storage layers. Thus, the disadvantage inherent in prior art methods is prevented, wherein etching means can penetrate into the marginal area between the individual storage elements and the insulating material, e.g. masking lacquer, covering such elements.

The method of the invention is characterized by the following steps:

(a) A closed ferromagnetic layer, preferably of nickel/iron is applied on the surface of one side of a carrier plate serving as return circuits or sensing lines, as the case may be, (b) This ferromagnetic layer is covered by an insulating material, such as a masking lacquer, in the form of layers in the areas of the desired storage elements, (c) A nonmagnetic metal, nonmagnetic metallic compound or alloy is conductively or electrochemically applied on the areas free of insulating-material layers of the ferromagnetic layer, (d) Such arrangement is tempered, (e) Upon termination of the tempering process the metal, metallic compound or alloy, remaining on the ferromagnetic layer which has not been vapor-diffused into such layer is conductively or electrochemically removed, and (f) The insulating layers are subsequently removed.

It will be noted that the selection of the diffusion metal employed may be made merely on the basis that it is nonmagnetic and capable of diffusion into the magnetic layer without damage to the latter or the carrier employed. However, it is believed clear, as previously mentioned, that the use of a metal with a low melting point minimizes the possibility of such damage etc., in view of which the lower melting metals are deemed preferable.

Changes may be made within the scope and spirit of the appended claims which define what is believed to be new and desired to have protected by Letters Patent.

I claim:

1. A method of increasing the coercive field strength of a storage element comprising a storage layer of ferromagnetic material, preferably a nickel-iron layer, said layer having a uniaxial anisotropy of magnetization, comprising the steps of electrochemically applying a coating of a nonmagnetic material on the storage layer, said nonmagnetic material selected from a class consisting of nonmagnetic metals, nonmagnetic metallic compounds and nonmagnetic alloys each having a relatively low melting point as compared with the ferromagnetic layer, and having a metal being diffusible into said storage layer without damage thereto, and heating the coated storage layer at a temperature below the melting point of the nonmagnetic material for a desired time to diffuse a portion of the metal of the coating into the storage layer to increase the coercive field strength to a desired value.

2. A method according to claim 1, wherein said heating step occurs during the step of applying said coating.

3. A method according to claim 1, wherein said heating step occurs subsequent to the step of applying said coating.

4. A method according to claim 1, wherein the metal of said nonmagnetic material is selected from a class consisting of indium, cadmium, zinc, tin, and bismuth.

5. A method according to claim 1, wherein the heating is carried out in an air atmosphere.

6. A method according to claim 1, wherein said heating step further includes measuring the value of the coercive field strength during the heating operation, and correspondingly controlling the duration of the heating operation in respect to the measured values.

7. A method according to claim 1, including the step of removing from the storage layer any portion of the nonmagnetic material which had not diffused into said storage layer during the heating step.

8. A method according to claim 7, wherein the remaining portion of nonmagnetic material is conductively removed.

9. A method according to claim 7, wherein the remaining portion of nonmagnetic material is removed by etching.

10. A method of manufacturing a storage matrix having storage elements disposed in rows and columns comprising ferromagnetic layers particularly of nickel-iron, comprising the steps of:

applying a layer of ferromagnetic material, preferably of nickel-iron layer, on the surface of a side of a carrier plate;

covering desired areas of said ferromagnetic layer with a layer of masking material to provide areas free of said masking layer;

applying a coating of nonmagnetic material, selected from a class consisting of nonmagnetic metals, nonmagnetic metallic compounds and nonmagnetic alloys on the areas of said ferromagnetic layer free of said masking material;

heating said coated ferromagnetic layers to diffuse a portion of the coating of nonmagnetic material into the ferromagnetic layer to increase the coercive field strength thereof;

removing subsequent to termination of the heating step, excess portions of coating of the nonmagnetic material remaining on the ferromagnetic layer which excess portion had not been diffused into said layer of ferromagnetic material; and subsequently removing the masking materials.

References Cited

UNITED STATES PATENTS

| | | | |
|---|---|---|---|
| 1,998,840 | 4/1935 | Legg et al. | 156—18X |
| 3,154,840 | 11/1964 | Shahbender | 29—604 |
| 3,142,112 | 7/1964 | Burkig et al. | 29—604X |
| 3,183,579 | 5/1965 | Briggs et al. | 29—604 |
| 3,257,629 | 6/1966 | Kornreich | 29—604 |
| 3,292,164 | 12/1966 | Wells et al. | 340—174 |
| 3,343,145 | 9/1967 | Bertelsen | 340—174 |
| 3,362,065 | 1/1968 | Lavriente et al. | 29—604 |
| 3,375,091 | 3/1968 | Feldtkeller | 29—194 |
| 3,436,813 | 4/1969 | Wells et al. | 29—604 |

JOHN H. MACK, Primary Examiner
T. TUFARIELLO, Assistant Examiner

U.S. Cl. X.R.

148—122; 156—18; 204—15; 340—174